United States Patent [19]

Hazenbroek

[11] Patent Number: 4,993,115
[45] Date of Patent: Feb. 19, 1991

[54] COMPACT WING CUT-OFF MACHINE

[76] Inventor: Jacobus E. Hazenbroek, Burg de Zeeuwstraat 52, Numansdorp, Netherlands

[21] Appl. No.: 447,902
[22] Filed: Dec. 8, 1989
[51] Int. Cl.⁵ ............................................. A22C 25/18
[52] U.S. Cl. ....................................... 452/169; 17/46; 17/11
[58] Field of Search .................. 17/52, 11, 46

[56] References Cited

U.S. PATENT DOCUMENTS

| | | | |
|---|---|---|---|
| 3,731,344 | 5/1973 | Phares et al. | 17/11 |
| 4,016,624 | 4/1977 | Martin et al. | 17/11 |
| 4,083,083 | 4/1978 | Duncan et al. | 17/11 |
| 4,306,335 | 12/1981 | Hawk et al. | 17/52 |
| 4,503,587 | 3/1985 | Martin | 17/11 |
| 4,536,919 | 8/1985 | Cashweir et al. | 17/11 |
| 4,562,613 | 1/1986 | Lewis | 17/11 |
| 4,563,791 | 1/1986 | Martin et al. | 17/11 |
| 4,597,136 | 7/1986 | Hazenbroek | 17/11 |
| 4,648,155 | 3/1987 | Burnett | 17/11 |
| 4,873,746 | 10/1989 | Scheier et al. | 17/52 |

Primary Examiner—Willis Little
Attorney, Agent, or Firm—Thomas & Kerr

[57] ABSTRACT

A wing removal method and apparatus comprising a conveyor (31) which a poultry carcass (9) is placed for processing the wings (7) extending downwardly below the conveyors. The back of the carcass (9) is placed upon a pair of cradles (32) and engaged by a mandrel (33) in the opening created by the prior removal of the neck of the bird from the carcass.

14 Claims, 3 Drawing Sheets

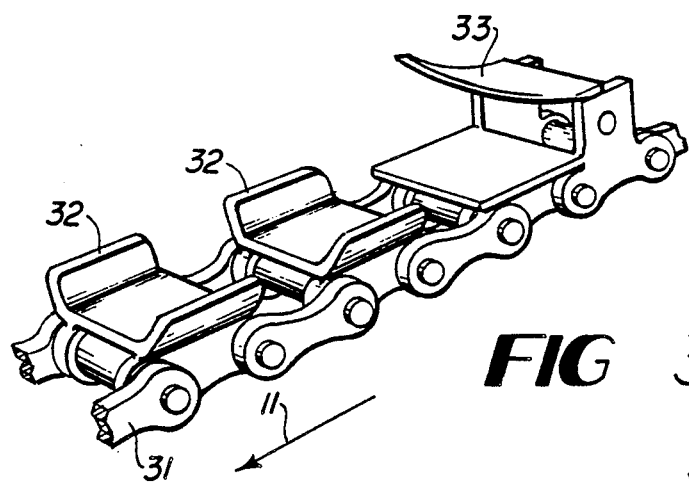
FIG 3
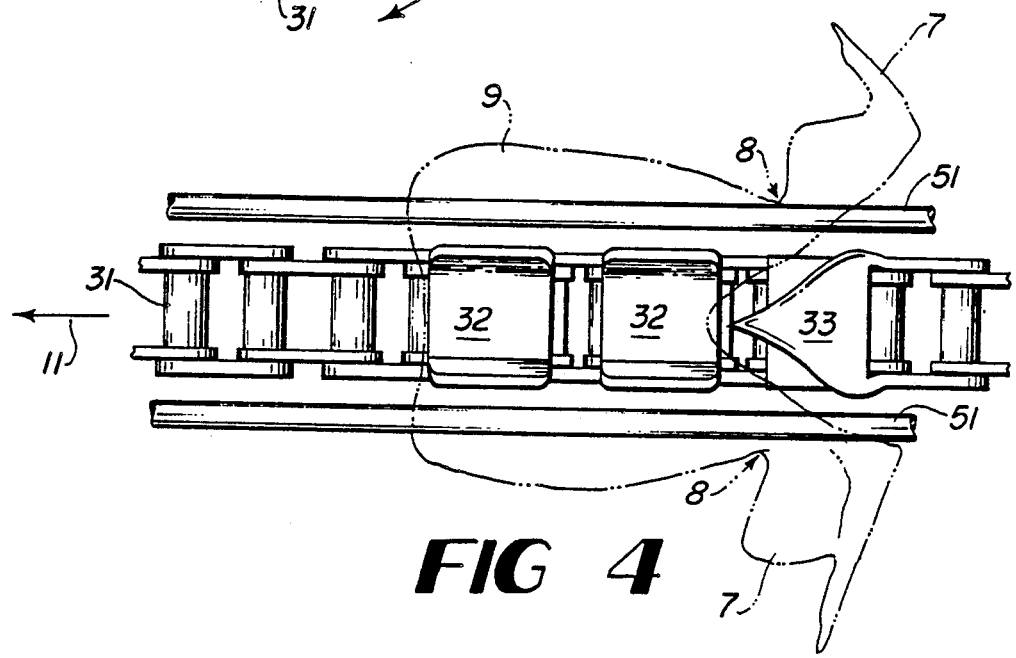
FIG 4
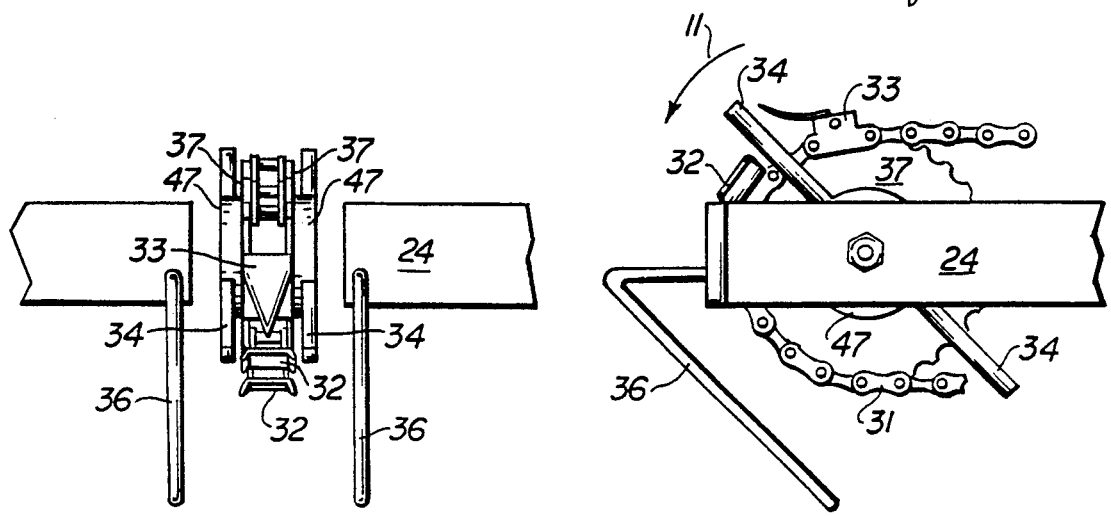
FIG 7
FIG 8

COMPACT WING CUT-OFF MACHINE

FIELD OF THE INVENTION

The disclosed invention relates in general to a method and apparatus for separating the wings of eviscerated poultry carcasses from the breast portions of the carcasses as the carcasses are moved in series along a processing path, and more particularly to a method and apparatus for automatically removing the wings of an eviscerated poultry carcass from the upper back and breast of the carcass that already has had its legs and lower back removed, as the carcass is moved through the cutting area of a machine.

BACKGROUND OF THE INVENTION

Automated processing machines have been developed which utilize varied types of rotating and pivoting cutting blades which move into contact with and through the shoulder joints of poultry carcasses as the carcasses move in series along a processing path, to remove the wings from the carcasses. A problem with these early processing machines was the hazard of forming bone chips and other loose fragments of bone with the cutting blades and the bone chips and fragments becoming caught in the meat of the poultry carcass that was to be shipped to the consumer.

More recent poultry processing systems, as illustrated by U. S. Pat. Nos. 4,016,624, 4,503,587, and 4,536,919, have been disclosed which tend to reduce this risk of bone fragments being dislodged by the cutting blades. For the operation of these machines, a poultry carcass is placed on a conveyor for movement through the cutting area of the machine Stationary rotary cutting blades straddling the conveyor sever the main tendon at each shoulder joint between the wings and the breast of the poultry carcass Guide rods on either side of the conveyor support the wings and exert a frictional drag on the wings as the carcass is moved forward by the conveyor toward the cutting blades. This dragging force causes the shoulder joints between the wings and the poultry breast to partially open for passage of the cutting blades through the shoulder with minimal contact with the bones of the joint.

The design and operation of these current processing machines have reduced the risk of bone fragments in cut-up poultry. However, in doing so, these devices have a tendency to pull meat pieces away from the breast portions of the poultry carcasses and remove these pieces with the less valuable wings Further, the processing speed of these machines is slow as each carcass must be carefully positioned on the conveyor for cutting and later with some machines and carcasses must be manually removed by the operator before another carcass can take its place on the conveyor.

Thus, it would be a distinct improvement in the art if a poultry processing method and apparatus were devised for rapidly separating the wings from the breasts of poultry carcasses without substantial hazard of creating bone fragments from the severing of the shoulder joints, and retaining as much meat from the wing with the breast as possible.

Accordingly, it is the provision of such a method and apparatus to which the present invention is primarily directed.

SUMMARY OF THE INVENTION

Briefly described, the present invention comprises a method and apparatus for automatically separating the wings from the breast portions of eviscerated poultry carcasses as the carcasses proceed in series on their backs on an endless moving surface conveyor with the wings extending downwardly below the path of the carcass, and straddling the surface conveyor This tends to open the shoulder joints of the birds. Each carcass is positioned upon the conveyor on a pair of cradle brackets upon which the back of the carcass rests with its breast facing upwardly and with its neck opening extending away from the direction of movement, and the carcass is held firmly in place by a mandrel inserted into the opening created by the previous removal of the neck of the bird A pair of wing supporting rails straddling the moving surface conveyor extend along the conveyor into the cutting area of the apparatus with the wings riding on top of the wing supporting rails, with the rails supporting and positioning the wings during movement of the wings toward the cutting area A pair of wing positioning rails engage the carcass about the shoulder joint between the breast and the wings. The combination of the supporting and positioning rails contacting the carcass at the shoulder joint isolates and positions the wings and wing joints for the subsequent cutting function and the separation of the wings from the carcass without creating bone fragments and substantially without removing breast meat from the carcass.

A pair of stationary cutting members at the input end of the conveyor straddle the moving conveyor adjacent the upper guide rails, extending below the upper guide rails to engage the shoulder joints of the poultry carcass and create a guide incision in the top of the shoulder joint. A pair of cutting disks positioned behind the stationary cutting members straddling the moving surface conveyor engage the shoulder joints of the carcass at the guide incision made by the stationary cutting members and complete the cutting of the wing/carcass joints and completes the separation of the wings from the carcass. A pair of parallel clearing members attached to opposite sides of a sprocket at the discharge end of the moving surface conveyor rotate with the sprocket to contact the carcass after the wings have been removed, forcing the carcass upwardly and away from the moving surface conveyor, automatically removing the carcass from the apparatus without further contact by the operator.

The overall cooperation of parts of the apparatus causes the wings to be oriented at the shoulder joints in an attitude that tends to separate the bones of the shoulder joints, and when the first incision is made at the surface of each shoulder joint the tissue no longer holds the joint together so that the joint partially opens. The second cutting blade is able to reach through the joint and cut the remaining tissue about the joint without substantial hazard of cutting the bones of the joint.

Thus it is an object of this invention to provide an improved method and apparatus for rapidly and reliably separating the wings from poultry carcasses, which retains as much of the meat from the wings and breasts as possible, without damaging the bones of the wing joint of the carcasses, and without the hazard of causing bone fragments to become lodged in the meat of the carcasses.

Another object of this invention is to provide an improved method and apparatus for separating the wings from poultry carcasses by creating guide incisions at the shoulder joints of the carcass with a pair of stationary cutting members thus allowing a cleaner separating of the wings from the carcass as the cutting disks proceed through the guide incision, whereby breast meat is not pulled from the breast portion of the carcass and removed with the wings.

Another object of this invention is to provide an improved method and apparatus for automatically removing the carcass from the poultry processing apparatus upon completion of the separation of the wings from the carcass, without requiring manual removal of the carcass by the operator, thus increasing the rate of automatic processing of the poultry carcass.

Another object of this invention is to provide a poultry processing machine that is relatively small and is inexpensive to produce and to operate and which reliably functions to remove wings from poultry carcasses while retaining a maximum amount of meat from about the wing joint with the breast and with a minimum hazard of causing bone chips to be formed.

Other objects, features and advantages of the present invention will become apparent upon reading the following specification, when taken in conjunction with the accompanying drawings.

BRIEF DESCRIPTION OF THE DRAWINGS

FIG. 3 is a perspective illustration of the cradles and mandrel that support a poultry carcass on the endless moving surface conveyor.

FIG. 4 is a plan view of the cradles and mandrel that support a poultry carcass on the endless moving conveyor with a poultry carcass shown in dashed lines mounted on the cradles and mandrel.

FIG. 7 is an end view of the clearing members mounted on the sprocket at the discharge end of the moving surface conveyor and the discharge bars at the discharge end of the endless moving surface conveyor.

FIG. 8 is a side elevational view of a clearing member affixed to the sprocket and the discharge bars at discharge end of the apparatus.

DETAILED DESCRIPTION

Figure 1:
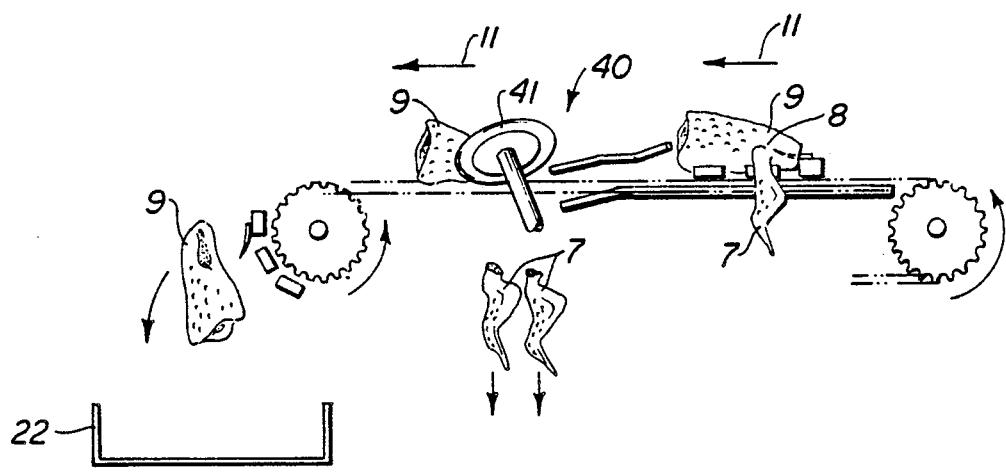
FIG. 1 is a schematic representation of the compact wing cut-off machine and the process by which the wings are removed from the carcasses of the birds.

Referring now in more detail to the drawings in which like numerals indicate like parts throughout the several views, FIG. 1 schematically illustrates the process practiced by the disclosed compact wing cut-off machine wherein a series of carcasses 9 of chickens or other birds are placed on the wing removal apparatus 10 by placing each bird with its back extending downwardly and its neck opening facing rearwardly and with the bird received in a pair of longitudinally spaced cradles 32 of the surface 31. The birds are moved in the direction of arrows 11 through a cutting station 40 where a pair of stationary knives 44 form guide incision in the wing/carcass joints 8 of the carcass 9 and a pair of rotary disc cutters 41 subsequently complete the severing of the wings 7 from the carcasses.

Figure 2:
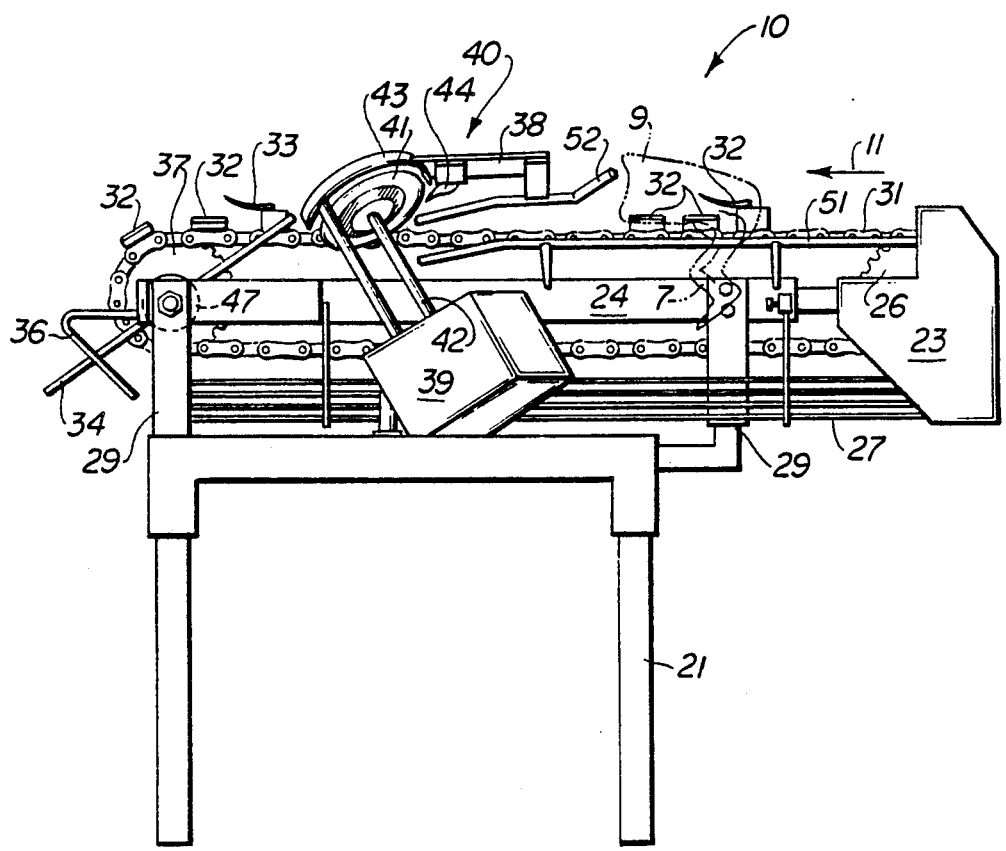
FIG. 2 is a side elevational view of the compact wing cut-off machine embodying the principles of the present invention.

FIG. 2 illustrates the compact wing cut-off machine 10 in more detail, which comprises an endless moving conveyor 31 which extends from around a sprocket 26 at the input end of the apparatus longitudinally toward and around a second sprocket 37 at the discharge end of the apparatus, completing an elongated circle between the two sprockets 26 and 37 at the opposite ends of the apparatus. A motor (not shown) rotates the sprocket 37 at the discharge end of the apparatus causing the endless moving conveyor 31 to be pulled continually forward around sprocket 37 and in the reverse direction toward sprocket 26 at the input end of the apparatus in a continuous loop.

As further detailed in FIGS. 3 and 4, U-shaped cradle members 32 are attached to the surface of the endless moving surface conveyor for supporting the back of a poultry carcass 9 as it is moved through the apparatus on the endless moving surface conveyor and the wings 7 of the carcass 9 are removed. Positioned directly behind the U-shaped cradles 32 is a wedge-shaped mandrel 33 against which the neck opening of the carcass is engaged with the mandrel 33 inserting into the space left in the carcass by the prior removal of the neck portion of the carcass to firmly secure the carcass in stationary cutting position on the moving surface conveyor 31, preventing shifting movement by the carcass during the cutting operations.

Figure 5:
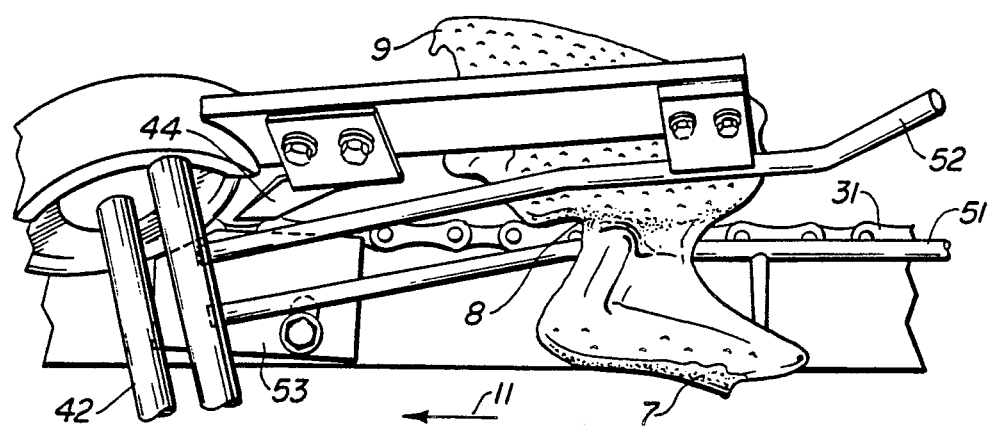
FIG. 5 is a side elevational view of the wing positioning rails and wing supporting rails isolating and positioning a wing of a carcass for separation.

As shown in FIGS. 2, and 5 and a pair of wing supporting rails 51 extend along the length of the endless moving conveyor 31 from the sprocket 26 at the input end of the apparatus to a point within the cutting station 40 of the apparatus, straddling the moving surface conveyor 31 and supporting the wings 7 of a poultry carcass 9 being moved forward by the moving surface conveyor 31. A pair of wing positioning rails 52 are spaced directly above and extend parallel to the wing support rails 51 straddling the moving surface conveyor for engaging the top surface of the wings of the carcass to isolate the shoulder joints 8 between the wings and the breast for cleaner removal of the wings 7 at the cutting station.

Figure 6:
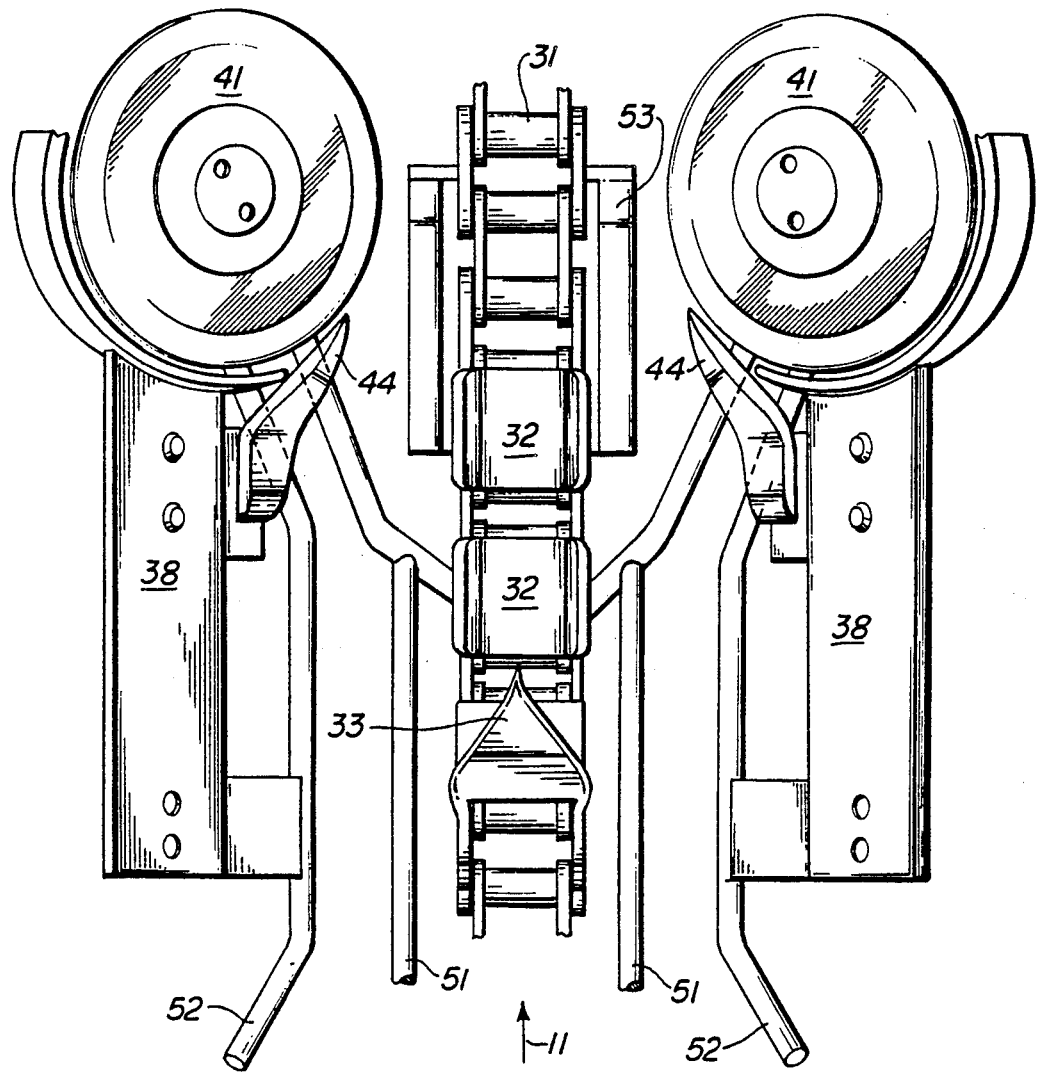
FIg. 6 is a plan view of the cutting area of the apparatus.

The cutting station of the apparatus illustrated in FIG. 6 comprises a pair of stationary cutting blades 44 mounted on support plates 38 on either side of the moving surface conveyor 31, extending adjacent to the wing positioning rails 52 to a cutting position between the wing positioning rails 52 and the wing supporting rails 51. Behind the stationary cutting blades 44 are a pair of rotary cutting disks 41 aligned in a relationship adjacent each cutting blade 44 in a position to complete the separation and removal of the wings 7 begun by the cutting blades 44. The rotary cutting disks 41 are each powered by a motor 39 mounted on opposite sides and the conveyor 31 rotating drive shafts 42 which connect the motors 39 to the cutting disks 41 and rotate the cutting disks 41. A U-shaped conveyor stabilizing block 53 straddles the underside of the conveyor 3!, stabilizing the moving surface conveyor 31 and retarding side to side movement of the portion of the movable surface conveyor 31 along which the cutting blades 44 and cutting disks 41 separate and remove the wings 7 from a poultry carcass 9.

At the discharge end of the movable conveyor 31 is located the breast removal means of the apparatus (FIGS. 7 and 8), for clearing the processed breast portion of the carcass 9 from the apparatus after the removal of the wings 7 from the carcass 9. A pair of parallel clearing bars 34 are mounted upon the sprocket 37 at the discharge end of the apparatus, extending for a length greater than the diameter of the sprocket 37 through the center of a sprocket washer 47 The clearing bars 34 rotate with the movement of the sprocket 37 to contact the breast portion of carcass 9 from behind the mandrel 33 The forward motion of the cleaning bars 34 forces the breast upward and away from the mandrel 33 and the cradles 32. A pair of parallel discharge bars attached to a machine support 24 prevent the breast portion from the further movement along the path of the conveyor 31, urging the breast portion into a storage bin (not shown) to clear the apparatus.

In operation of the wing removal apparatus 10 illustrated in FIG. 2, a poultry carcass 9 having the legs, thighs and lower back portions previously removed from the breast and upper back portions of the carcass 9 is positioned on the moving surface conveyor 31 by an operator. The operator orients the back of the poultry carcass over a pair of U-shaped cradles 32, with the back of the carcass resting on top of the cradles 32 and pulls back on the wings 7 of the carcass 9, forcing the carcass onto the mandrel 33 to secure the carcass 9 in cutting position with the tail opening of the carcass 9 facing forward and the neck opening of the carcass 9 facing rearwardly engaged by the mandrel 33. The wings 7 of the carcass 9 hang down adjacent to the sides of the conveyor 31 and are spread outwardly as the wing supporting rails 51 straddling the moving surface conveyor 31 contact the underside of the shoulder joints 8 between the carcass 9 and the wings 7 and exert a backward dragging force upon the wings 7.

As the carcass enters the cutting station of the apparatus prior to the removal of the wings 7 from the carcass 9 (FIG. 5), a pair of wing positioning rails 52 spaced above the wing supporting rails 51 contact the top surfaces of the shoulder joints 8. The positioning rails 52 slope downwardly to progressively force the wings 7 down over the supporting rails 51 causing the shoulder joints 8 to be isolated in an open position with the bones of the wings 7 dislocated from the shoulder joints 8 for cleaner separation. As the carcass 9 proceeds forward on the conveyor 31 with the shoulder joints 8 opened the stationary cutting blades 44 (FIG. 6) engage the top surface of the joints 8 in this opening to create a guide incision. This tends to further open the joints 8 to provide a space into which the rotary cutting disks can penetrate substantially without engaging the bones of the joints 8 Immediately after the stationary cutting blades 44 begin the wing separating operation, the cutting disks 41 which are positioned directly behind the cutting blades 44, engage the shoulder joints 8 at the guide incision created by the cutting blades 44. As the cutting disks 41 cut through the shoulder joints 8 of the carcass 9, the wings 7 are cleanly separated from the poultry carcass 9 substantially without the risk of bone fragments being lodged in the breast meat and without the undesired removal of breast meat with the removal of the wings 7.

After the wings 7 have been separated from the breasts of the carcass 9, the wings 7 fall to the lower portion of the apparatus either into a storage bin or onto a surface conveyor (not shown) for disposal. The breast of the poultry carcass 9 proceeds along the surface conveyor 31 toward the discharge end of the conveyor 31. At the discharge end of the conveyor 31, a sprocket 37 (FIGS. 7 and 8) with a pair of parallel clearing bars 34 affixed to either side of the sprocket 37 rotate with the rotation of the sprocket 37 to engage the shoulder of the breast, coming into contact with the shoulders of the breast from behind the mandrel 33 As the clearing bars 34 are rotated forward by the sprocket 37, they force the breast upward freeing the breast from engagement by the mandrel 33 and urging the breast away from the mandrel 33 and cradles 32. A pair of discharge bars 36 affixed to machine support 24 of the apparatus complete the removal of the breast by barring any further movement of the breast along the path of the moving surface conveyor 31, forcing the breast forward into a storage bin Thus the poultry carcass 9 is automatically removed without the necessity of further contact by the operator, completely clearing the apparatus for continued operation, consequently allowing an increase in the processing rate of poultry carcasses.

It is thus seen that a method and apparatus is now provided for separating and removing the wings from he breast portions of poultry carcasses allowing for an increase in the process rate of these carcasses. The wings are separated in such a manner to allow for a clean cut through the dislocated shoulder joints of the carcass thereby significantly reducing the risk of bone fragments being created and embedded in the breast meat as well as reducing the undesired removal of breast meat with the wings.

While this invention has been described in detail in a preferred embodiment thereof, it should be understood that the described embodiment merely illustrates the preferred form of the invention and variations or modifications may be made thereto without departing from the spirit and scope of the invention, as set forth in the following claims.

What is claimed is:

1. A method for removing wings from the upper carcass of a previously eviscerated bird which was previously separated from the lower back and legs of the bird comprising:

advancing a plurality of upper carcasses in series along a processing path with a surface conveyor with the upper back portions of each upper carcass facing downwardly and supported on the surface conveyor, with the neck portions facing rearwardly of the path and the breast portion facing upwardly;

as the upper carcasses are advanced along the processing path by the surface conveyor, progressively urging the wings of each upper carcass downwardly relative to the carcass to progressively urge the wing shoulder joints toward an open position;

while the wings are urged downwardly, precutting on each side of the carcass into the wing shoulder joints to form a guide incision into each wing shoulder joint so that the guide incisions formed into the shoulder joints and the downward urging of the wings tend to partially separate the bones of the wing shoulder joints; and while the wings are urged downwardly and the wing shoulder joints are partially separated, cutting through the guide incision and between the bones in each wing shoulder joint on each side of the upper carcass to separate the wings from the carcass.

2. The method of claim 1, wherein the step of progressively urging the wings downwardly comprises positioning the shoulder joints between a pair of guide bars that are sloped downwardly along the processing path and urging the wings downwardly with the guide rods.

3. The method of claim 1 and wherein the step of advancing the plurality of upper carcasses in series along a processing path with a surface conveyor comprises supporting the back of each bird in a pair of adjacent cradles mounted on the surface conveyor and engaging the neck opening of the bird with a mandrel mounted on the surface conveyor and moving the surface conveyor along the processing path.

4. A method of removing the wings from the upper carcasses of previously eviscerated birds comprising the steps of:
supporting each carcass on a cradle means mounted on an endless surface conveyor and engaging the neck opening of each upper carcass with a mandrel mounted on the conveyor;
advancing the upper carcasses in series along a processing path with the mandrels pushing the carcasses and the cradle means supporting the carcasses;
as the carcasses are advanced along the processing path by the conveyor, progressively urging the wings of each carcass away from the breast and rearwardly relative to the direction of movement of the carcass to progressively urge the wing shoulder joints toward an open position;
while the wings are urged away from the breasts and rearwardly relative to the direction of movement of the carcasses, precutting on each side of the upper carcasses into the wing shoulder joints to form a guide incision in each wing shoulder joint so that the guide incision into the shoulder joints and the downward urging of the wings tend to partially separate the bones of the wing shoulder joints;
cutting through the guide incision between the bones of each wing shoulder joint with a cutter on each side of the upper carcasses to separate the wings from the upper carcasses;
contacting the shoulder portions of the carcasses on opposite sides of the neck openings of the carcasses with a pair of clearing members; and
rotating the clearing members in the direction of the processing path to force the carcasses away from the cradle means and mandrel and to urge the carcasses into a storage means.

5. A method of separating the wings from the upper back and breast portion of the upper carcasses of previously eviscerated birds, comprising:
moving the upper carcasses in series along a processing path on an endless moving surface conveyor toward a cutting station having first and second cutting mechanisms for separating the wings from the upper back and breast portions of the upper carcasses;
as each upper carcass is moved along the processing path, tilting the wings away from the breast about the back of each upper carcass and toward the neck area of the upper carcass so as to tend to open the joints between the wings and the back of each upper carcass;
engaging the shoulder joints of the upper carcass with the first cutting mechanism of the cutting station while the wings are tilted so as to form an opening into the shoulder joints and partially separating the wings from the upper carcass at the shoulder joints; and
engaging the partially separated shoulder joints at their openings with a second cutting mechanism of the cutting station while the wings are tilted to complete the separation of the wings from the upper carcass.

6. The method of claim 5 wherein the step of moving and upper carcass along a processing path on an endless moving surface conveyor comprises supporting the downward facing side of the poultry carcass on first and second cradle members and engaging the neck opening of the upper carcass with a mandrel member for positioning and restraining the poultry carcass in alignment for engagement with first and second cutting mechanisms of the cutting station.

7. Apparatus for separating the wings from a poultry carcass or the like, comprising:
an endless movable surface conveyor for moving carcasses in series along a processing path with the wings extending downwardly below the carcasses;
a cutting station positioned along the processing path through which the carcasses are moved by said movable surface conveyor, said cutting station including a cutting mechanism for separating the wings from the poultry carcasses;
poultry carcass mounting means positioned at intervals on said movable surface conveyor for supporting the poultry carcasses as they are moved toward said cutting station;
a first carcass stabilizing means extending adjacent and along the processing path toward said cutting station for supporting the wings of the poultry carcass in a downwardly inclined attitude as the carcasses are moved along said surface conveyor into said cutting station so as to tend to open the shoulder joints;
a second carcass stabilizing means extending along the processing path and above said first carcass stabilizing means for aligning the shoulder joints of poultry carcass with said cutting station as the carcass pass through said cutting station;
a sprocket member at one end of said movable surface conveyor following said cutting station and adapted to rotate with the forward movement of said movable surface conveyor; and
parallel clearing members affixed on opposite sides of said sprocket member and adapted to be rotated by said sprocket member into engagement with the poultry carcass to urge the poultry carcass upwardly and away from said mounting means on said movable surface conveyor;
whereby the shoulder joints are opened and separated by the combined downward movements of the wings and the engagement of the joint areas with the cutting mechanism and the poultry carcass is removed from said mounting means by the engagement of said cleaning members with the poultry carcass.

8. The apparatus for separating the wings from a poultry carcass or the like as claimed in claim 7 wherein said mounting means for positioning and supporting the poultry carcass as it is moved toward said cutting station with the wings of the poultry carcass extending below the processing path comprises first and second cradle members for supporting the poultry carcass on said movable surface conveyor and a mandrel mechanism oriented behind said second cradle member for contacting the poultry carcass and positioning the poultry carcass in an upright alignment on said first and second cradle members as the poultry carcass is carried along the processing path on said movable surface conveyor toward said cutting station.

9. The apparatus for separating the wings from a poultry carcass or the like as claimed in claim 7 wherein said first and second stabilizing means for supporting and aligning the poultry carcasses as they are moved with the wings extending below the processing path on said movable surface conveyor through said cutting station of the apparatus further comprises a pair of parallel supporting rails straddling said movable surface conveyor and extending adjacent to the sides thereof into said cutting station for supporting the wing of the poultry carcass, and a pair of parallel positioning rails positioned on opposite sides of said endless movable surface conveyor in a parallel relationship above said supporting members for restraining the poultry carcass and maintaining proper alignment of the wings of a poultry carcass as the wings enter said cutting station.

10. The apparatus for separating the wings from a poultry carcass or the like as claimed in claim 7 wherein said cutting station for separating the wings from the poultry carcass further includes a pair of cutting members between said supporting members and said conveyor for engaging the poultry carcass at a joint between the wings and the body portion of the poultry carcass to create a guide incision, and a pair of movable rotating cutting disks at the rear of said cutting station for engaging the poultry carcass at the guide incision, completing the separation of the wings of the poultry carcass from the body portion of the poultry carcass.

11. An apparatus for removing wings from the upper carcass of a previously eviscerated bird which was previously separated from the lower back and legs of the bird comprising:
   surface conveyor means for advancing a plurality of upper carcasses in series along a processing path with the upper back portions facing downwardly and supported on said surface conveyor means, with the neck portions of each upper carcass facing rearwardly of the path and the breast portion facing upwardly;
   guide means for progressively urging the wings of each upper carcass downwardly relative to the carcass to progressively urge the wing shoulder joints to an open position as the upper carcasses are advanced by said surface conveyor means;
   stationary cutting members positioned on opposite sides of said surface conveyor means for precutting on each side of the carcass into the wing shoulder joints to form a guide incision in each wing should joint so that the precut into the shoulder joints and the downward urging of the wings tend to partially separate the bones of the wing shoulder joints; and
   rotary disc cutter means positioned on opposite sides of said surface conveyor means and aligned with the stationary cutting member for cutting into the guide incision and further through each wing shoulder joint to separate the wings from the carcass.

12. The apparatus of claim 11 and wherein said guide means comprises pairs of parallel guide rails mounted on opposite sides of said surface conveyor means, sloping downwardly along the processing path for straddling and guiding the wings of each upper carcass downwardly as said surface conveyor means moves the wings of the carcass along said guide rods.

13. The apparatus of claim 11 and further including first and second cradle members mounted in series on said surface conveyor means for supporting each upper carcass on said surface conveyor means and a mandrel member mounted on said surface conveyor means behind said second cradle member for engaging each upper carcass and positioning each upper carcass in an upright alignment on said first and second cradle members as each upper carcass is carried by said surface conveyor means along said processing path.

14. The apparatus of claim 11 and further including a sprocket member mounted at one end of said surface conveyor means behind said rotary disc cutter means and rotating with the forward movement of said surface conveyor means, and a pair of parallel clearing members mounted to opposite sides of said sprocket member so as to rotate with said sprocket member into engagement with each upper carcass to urge each upper carcass from said surface conveyor means to thereby remove each upper carcass from said surface conveyor means.

* * * * *